(12) United States Patent
Jones et al.

(10) Patent No.: US 10,710,569 B2
(45) Date of Patent: Jul. 14, 2020

(54) METHOD FOR BLEEDING A VEHICLE BRAKE SYSTEM

(71) Applicant: Ford Global Technologies, LLC, Dearborn, MI (US)

(72) Inventors: Kim Stephen Jones, Chelmsford (GB); Clive John Barton, Benfleet (GB); Ludwig Fein, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 14/085,148

(22) Filed: Nov. 20, 2013

(65) Prior Publication Data

US 2015/0136551 A1 May 21, 2015

(51) Int. Cl.
| | |
|---|---|
| *B60T 17/22* | (2006.01) |
| *B60T 13/68* | (2006.01) |
| *B60T 13/14* | (2006.01) |
| *B60T 13/66* | (2006.01) |

(52) U.S. Cl.
CPC .......... *B60T 17/222* (2013.01); *B60T 13/146* (2013.01); *B60T 13/662* (2013.01); *B60T 13/686* (2013.01)

(58) Field of Classification Search
CPC ....... B60T 17/02; B60T 17/222; F15B 21/044
See application file for complete search history.

(56) References Cited

U.S. PATENT DOCUMENTS

| | | | | |
|---|---|---|---|---|
| 4,568,131 A | * | 2/1986 | Blomberg | B60T 8/34 188/352 |
| 5,049,320 A | * | 9/1991 | Wang | B01F 3/0446 209/170 |
| 5,722,744 A | * | 3/1998 | Kupfer | B60T 7/042 303/10 |
| 8,091,693 B2 | * | 1/2012 | Della Valle | F15B 21/005 141/65 |
| 2004/0103656 A1 | * | 6/2004 | Frazer | B60K 6/12 60/414 |
| 2004/0251740 A1 | * | 12/2004 | Schmidt | B60T 8/34 303/191 |
| 2009/0217822 A1 | * | 9/2009 | Cyr | C12C 13/10 99/276 |
| 2011/0072881 A1 | * | 3/2011 | Witt | F16K 24/04 73/19.05 |
| 2013/0032438 A1 | * | 2/2013 | Koons | B60T 8/4054 188/152 |
| 2014/0083290 A1 | * | 3/2014 | Larson | B01D 19/0036 95/12 |
| 2014/0202545 A1 | * | 7/2014 | Tesoriero | F15B 21/044 137/1 |

FOREIGN PATENT DOCUMENTS

| | | | |
|---|---|---|---|
| DE | 19603867 A1 | | 8/1997 |
| DE | 10103229 | * | 8/2002 |
| DE | 10103229 A1 | | 8/2002 |
| DE | 102009024441 A1 | | 12/2010 |

* cited by examiner

*Primary Examiner* — Vishal R Sahni
(74) *Attorney, Agent, or Firm* — Raymond L. Coppiellie; Burgess Law Office, PLLC

(57) ABSTRACT

A method for bleeding at least one part of a hydraulic brake system of a vehicle, wherein the brake system includes a brake circuit whose pressure can be selectively increased by a pump. The increased pressure is applied by the pump to the part of the brake system to be bled for a specified period of time without opening bleed valves.

14 Claims, 2 Drawing Sheets

METHOD FOR BLEEDING A VEHICLE BRAKE SYSTEM

CROSS-REFERENCE TO RELATED APPLICATIONS

Not applicable

BACKGROUND OF THE INVENTION

1. Field of the Invention

The present invention relates generally to a method for bleeding a hydraulic brake system of a vehicle; and, more specifically, to a method wherein the brake system includes a brake circuit whose pressure can be selectively increased by a pump.

2. Description of Related Art

Modern vehicles having hydraulic brake systems typically require a process known as bleeding. Bleeding as applied to hydraulic brake systems is a process used to purge or evacuate air or gas bubbles from the brake system. Activation or depression of the brake pedal may cause compression of air or gas bubbles remaining in the system leading to elastic behavior of the brake transmission path and increased pedal operation travel. Increased pedal travel is perceived by the driver as disturbing and in extreme cases can also represent a safety risk.

For various reasons, it is not always possible to obtain perfect air-free filling of the brake system during the initial filling procedure of a brake system with hydraulic fluid occurring in vehicle production. As set forth above, even if safety-critical thresholds are not exceeded unaccustomed long pedal operation travel leads to driver discomfort and correspondingly may result in returns or service visits, which should normally be avoided for a new vehicle.

A conventional bleeding process includes introducing hydraulic fluid from a pressure source at a point in the brake system; opening one or more bleed valves at other points; and allowing continuous hydraulic fluid flow through the bleed valves until no bubbles emanate from the bleed valve, requires a relatively high cost, so that such bleeding seems impractical as an obligatory step during vehicle production for time and cost reasons. Such systems may also require additional equipment and increased time costs, both during production of the vehicle and following repair work on the brake system.

SUMMARY OF THE INVENTION

According to one embodiment or aspect of the invention a method for bleeding a vehicle brake system includes using a pump to selectively increase the pressure in a brake circuit. The pressure increased for a specific period of time without opening a bleed valve. In one aspect of the invention, the increased pressure causes any residual or trapped air to dissolve in the brake fluid and essentially remains dissolved or chemically bound therein when the pressure is reduced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

As set forth more fully herein, one example of the present invention is a method for bleeding at least one part of a hydraulic brake system of a vehicle, wherein the brake system includes at least one brake circuit whose pressure can be selectively increased by at least one motor-driven pump. The pump produces an increased pressure in brake system for a specified period of time during which the bleed valves remain closed. As used herein the term bleeding is a procedure performed on a brake system that eliminates or reduces the presence of a compressible gas, for example air bubbles, in an incompressible liquid, for example brake fluid, located in the brake system since their presence in the brake system greatly reduces the hydraulic pressure that can be developed within the system.

Activation of the pump causes the brakes in the relevant brake circuits to be applied immediately to the maximum extent. Once this has occurred, no further hydraulic fluid can be transported and the pump is thus working against a closed output whereby a high hydrostatic pressure can build up. Applying relatively high pressures in the brake system without opening bleed valves ultimately leads to permanent removal of air from the brake system even after the pressure increase has ended.

The residual air or trapped air in the brake system dissolves in the brake fluid at the applied high pressures and essentially remains dissolved or chemically bound therein because of chemical or physical processes.

In addition, the residual air dissolves in the brake fluid and then with low pressures at other locations of the brake system, especially in the vicinity of the normally present master cylinder, precipitates out during communication with the expansion tank or master cylinder and ultimately escapes to the atmosphere.

According to one example of the present invention the method uses the pump or pumps provided for the pressure build-up in the brake system during braking interventions by an electronic stability controller (ESC). Because said pumps are already present in the brake system and can be selectively controlled to apply pressure in the brake system, the corresponding pressure increase can be achieved without additional equipment cost.

Figure 1:
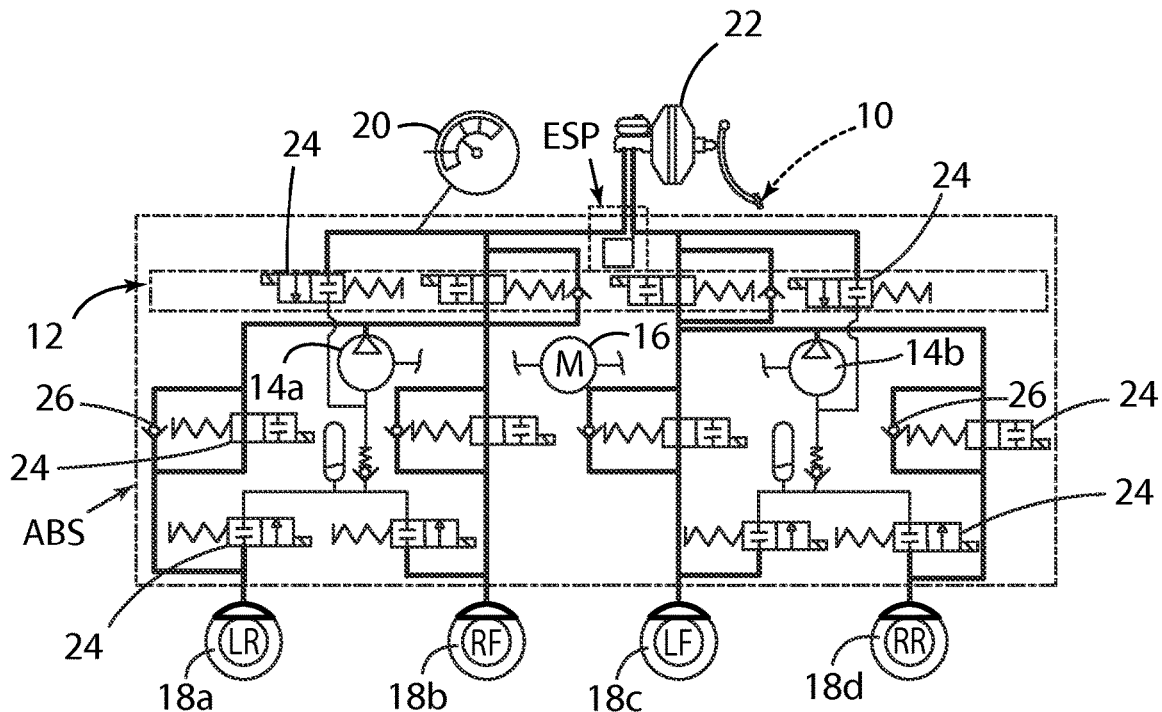
FIG. 1 is a schematic diagram of a vehicle brake system in the normal state without activation of ABS or ESC.
Figure 2:
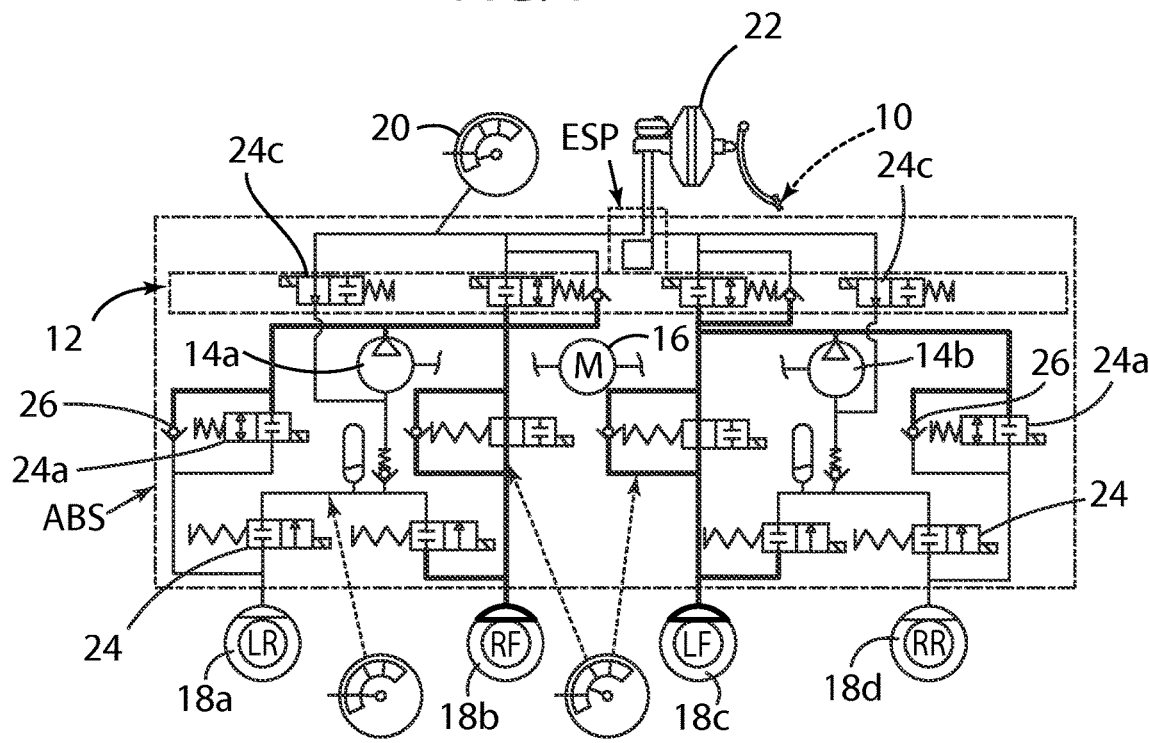
FIG. 2 is a schematic diagram of the vehicle brake system illustrated in FIG. 1 for an ESC intervention at the front wheel brakes.

As illustrated in FIGS. 1-2, the ESC pumps used in the brake system are normally electrically driven piston pumps 14a, 14b. These pumps 14a, 14b can generate a high overpressure of the order of magnitude of approx. 200 bar due to brake application requirements. As disclosed herein, the high pressure used during the method is generally more than 50 bar, preferably more than 100 bar, particularly preferably more than 180 to 200 bar. Such pressures are always still far below the allowable pressure limit for the brake system, which lies at approx. 300 bar and above. The maximum applied pressure lies in any case below the corresponding pressure limit.

According to the present invention, the increased pressure is applied in a stationary vehicle for a period of time of at least 5 seconds and less than two minutes, preferably of at least 10 seconds and less than 1 minute, particularly preferably of about 10 to 20 seconds. In one example of the present invention the high pressure phase last for a period of approximately 20 seconds. The duration of the high pressure phase depends on the continuous load capacity of the corresponding pumps in a pumping process against closed valves. To avoid a thermal overload the high pressure phase can also be applied intermittently with various cooling phases.

The bleeding process is preferably carried out for the part of the brake system that can be placed under increased pressure by the pump 14a, 14b with suitable positioning of control valves of the brake system. If there is a plurality of brake circuits that can be pressurized independently, they can be pressurized simultaneously or successively. In general, the master cylinder and of the expansion tank cannot be acted upon by increased pressure, because said devices are normally used on the induction side as a reservoir for the pumps 14a, 14b.

Preferably, the bleeding process according to the invention can be carried out after the first filling of the brake system with hydraulic fluid, preferably during the production process of the vehicle. In principle the process can however also be carried out in a workshop after working on the brake system.

In one embodiment, the bleeding process is preferably initiated by means of an external controller connected to a brake controller via a CAN bus. Wherein the brake controller is connected to a CAN bus within the vehicle and controls at least one electrically driven pump and a plurality of brake system control valves, The pump is started and the control valves of the brake system are adjusted so that the desired increased pressure builds up in the parts of the brake system that are capable of retaining pressure.

In another example, instead of or in addition to an external controller, the process may be initiated by means of a service menu that is internal to the vehicle. Of course, this may only take place with the vehicle stationary, because the brakes lock fully during the pressure increase.

If the pump can provide a higher pressure than the desired increased pressure, the pressure can possibly be limited by a safety bypass valve. Alternatively, the pressure can be adjusted or regulated by active regulation of the pump's revolution rate (possibly to zero) with measurement of the actual pressure.

Turning now to FIG. 1 there is shown a schematic diagram of a hydraulic brake system for an automobile with ABS and ESC. The illustrated brake system is one example as the invention can be used for a number of different brake system configurations. As illustrated, two mutually independent brake circuits are provided, each of which supplies diagonally opposing brakes 18a-d in an X configuration in the exemplary embodiment. Operation of the brake system can be carried out using a brake pedal 10 that uses a brake booster and a tandem master cylinder 22 to apply hydraulic pressure independently to both brake circuits. The lines thereby acted upon by pressure from the brake booster and master cylinder 22 are highlighted in FIG. 1 by thicker lines. The occurring pressure is indicated using a symbolic manometer 20 and is furthermore measured by means of a pressure sensor (pressure/voltage converter) in the case of the unit referred to with "ESP".

In order to implement ABS functionality, various solenoid valves are provided, which enable modulation of the brake force in a known manner by using intermediate storage. With a microprocessor-controlled brake control unit controlling the functions thereof in a known manner depending on a variety of vehicle parameters.

As illustrated in FIG. 2 during or when the ESC functions the brake pressure of one or more of the brakes 18a-d can be selectively adjusted by supplying additional fluid pressure. One or both of the pumps 14a, 14b associated with the respective brake circuits, which are driven by a common electric motor 16, can be activated by a (not illustrated) brake control unit and used to supply additional fluid pressure. In addition the brake control unit may also control the position of the illustrated control valves.

As illustrated the pumps 14a, 14b are connected on the suction side to the expansion tank/master cylinder 22, used as a reservoir, by a multi changeover valve 12 and are connected on the outlet side to the brakes 18a-18d. A plurality of solenoid valves 24 operate to adjust the pressure for each individual brake 18a-18d. A reverse flow of the hydraulic fluid into the reservoir area is prevented in this configuration by non-return valves.

FIG. 2 illustrates a brake system having an ESC intervention at the front wheels. The lines with low pressure (suction side of the activated pumps 14a, 14b) are shown by thin lines whereas the lines with high pressure are in bold. As shown the pumps 14a, 14b draw/suck fluid from the brake booster and master cylinder 22 through the open solenoid valve 24c. The high pressure or high static pressure, at levels set forth above, is generated by the pumps 14a, 14b, in the fluid lines shown in bold since the brakes 18a-18d remain locked. Accordingly, the pumps 14a, 14b operated to generate high pressure in the brake lines since the brakes are locked and any bleed valves are closed.

With the method according to the invention a comparable valve configuration is set up as shown in FIG. 2, wherein preferably all brakes of both circuits are simultaneously acted upon by a high pressure as previously described. That is valves 24a, associated with brakes 18a, 18d are placed in an open position wherein the high pressure generated by the pumps 14a, 14b acts on the individual brakes 18a, 18d.

Depending on the available power of the drive motor 16 for the pumps 14a, 14b, the application of pressure for both brake circuits can take place in series, whereas the other circuit is hydraulically connected so that either pump 14a, 14b experiences a low resistance per pump.

As previously described, for implementing the method according to the invention the pumps 14a, 14b are activated using the common drive motor 16 by means of an external control signal or a menu command in the maintenance menu of the vehicle for a specified period of time; e.g. 20 seconds. During which time a high static pressure, for example about 200 bar, is built up in the components of the brake system acted upon by this pressure.

Manually opened bleed valves, as provided in principle in any brake system at the ends of pipe runs (not shown in the figures), are not opened for the process according to the invention, so that this can take place automatically without manual interventions or monitoring.

Test series have shown that by this measure an improvement of the degree of bleeding of the brake system can be achieved, and this on a long-term basis.

Figure 3:
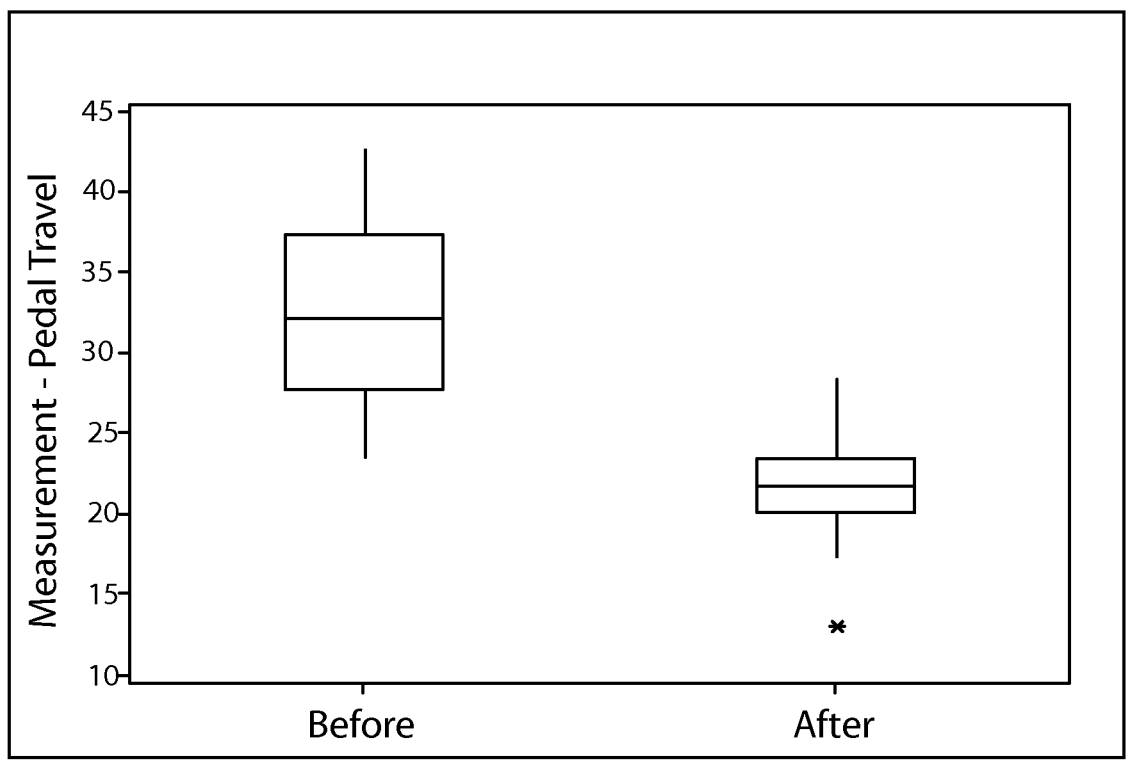
FIG. 3 is a schematic diagram that illustrates the improvements achievable within the framework of the invention during brake system bleeding.

This effect can be seen from the diagram of FIG. 3. FIG. 3 illustrates a comparison of the pedal movements (in arbitrary units), which are necessary for a specified brake force, for a number of vehicles and the associated standard deviation. As can be seen, the measurement values differ significantly before carrying out the method (left) according to the invention from those after carrying out the method (right); that is, the pedal travel is smaller overall and subject to significantly less fluctuation.

An additional aspect of the invention is that the method tests the brake system for pressure tightness because any leaks would be made noticeable at such pressures.

As set forth above, the brake system may include a brake system controller for use with a vehicle having a brake system including dynamic driving control and at least one pump used during the dynamic driving control. The controller operative to control the pump and associated control valves provided in the brake system so that the pump can apply pressure to at least one part of the brake system. Further, the method for bleeding the brake system is such that one pump is activated for a specified period of time to build up an increased pressure in at least one part of the brake system without the bleed valves being opened.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for bleeding a vehicle brake system including a brake circuit having a brake line containing a hydraulic fluid, a bleed valve in the brake circuit, and a pump comprising the step of using the pump to increase hydraulic fluid pressure in the brake line and on the bleed valve for a specified period of time without opening the bleed valve during bleeding of said brake system, wherein the step of increasing the pressure includes increasing the pressure to more than 50 bar.

2. The method of claim 1 wherein the pump provides for pressure build-up in the brake circuit during operation of an electronic dynamic driving control system.

3. The method of claim 1 wherein the step of increasing the pressure includes increasing the pressure to more than 100 bar.

4. The method of claim 1 wherein the step of increasing the pressure includes increasing the pressure between 180 to 200 bar.

5. The method of claim 1 wherein a plurality of control valves operate to control a part of the brake system that can be placed under increased pressure by the pump.

6. The method of claim 1 including the step of carrying out the bleeding process after the brake system is first filled with hydraulic fluid during the production process of a vehicle including the brake system.

7. The method as set forth in claim 1 including the step of providing the vehicle with an electronic brake controller connected to a CAN bus within the vehicle, the electronic brake controller controlling the pump, a plurality of brake system control valves, and an external controller connected via the CAN bus to the brake controller wherein the method includes the steps of using the external controller connected via the CAN bus to the brake controller to start the pump and setting the control valves of the brake system so that a desired pump pressure is built up in parts of the brake system that are capable of retaining pressure.

8. The method as set forth in claim 1 wherein the increased pressure causes any air to dissolve in the hydraulic fluid and essentially remain dissolved therein when the pressure is reduced.

9. A method for bleeding a vehicle brake system including a brake circuit having a brake line containing a hydraulic fluid, a bleed valve in the brake circuit, and a pump comprising the step of using the pump to increase hydraulic fluid pressure in the brake line and on the bleed valve for a specified period of time without opening the bleed valve during bleeding of said brake system, wherein the increased pressure is applied with the vehicle stationary for a period of time of at least 5 seconds and less than 2 minutes.

10. The method of claim 9 wherein the increased pressure is applied with the vehicle stationary for a period of time of at least 10 seconds and less than 1 minute.

11. The method of claim 9 wherein the increased pressure is applied with the vehicle stationary for a period of time between 10 seconds and 20 seconds.

12. A method for bleeding a vehicle brake system having a pump and a brake line including an associated bleed valve comprising the steps of:
using the pump to increase the pressure in the brake line, and on the associated bleed valve, to be bled to a pressure between 180 and 200 bar;
applying said pressure for a period between 10 seconds and 20 seconds to bleed said vehicle brake system; and
during bleeding maintaining the bleed valve in a closed position during the period that the pressure is increased and applied to the brake line.

13. A method as set forth in claim 12 including the step of using a plurality of control valves to select a part of the brake system to be bled.

14. A method as set forth in claim 13 including said brake system filled with brake fluid wherein the step of increasing the pressure in the part of the brake system to be bled causes any air in part of the brake system to be bled to dissolve in the brake fluid and essentially remain dissolved therein when the pressure is reduced.

\* \* \* \* \*